AMBULATORY TYPEWRITER

Filed Feb. 12, 1957 5 Sheets-Sheet 1

GEORGE VINCENT PALMER,
HARLEY E. PRITCHETT,
INVENTORS.

BY [signature]

ATTORNEY.

Aug. 18, 1959 G. V. PALMER ET AL 2,900,061

AMBULATORY TYPEWRITER

Filed Feb. 12, 1957 5 Sheets-Sheet 2

GEORGE VINCENT PALMER,
HARLEY E. PRITCHETT,
INVENTORS.

BY [signature]

ATTORNEY.

Aug. 18, 1959 G. V. PALMER ET AL 2,900,061

AMBULATORY TYPEWRITER

Filed Feb. 12, 1957 5 Sheets-Sheet 3

GEORGE VINCENT PALMER,
HARLEY E. PRITCHETT,
INVENTORS.

BY [signature]

ATTORNEY.

AMBULATORY TYPEWRITER

Filed Feb. 12, 1957 5 Sheets-Sheet 4

GEORGE VINCENT PALMER
HARRY E. PRITCHETT,
INVENTORS.

BY

[signature]

ATTORNEY.

Aug. 18, 1959 G. V. PALMER ET AL 2,900,061

AMBULATORY TYPEWRITER

Filed Feb. 12, 1957 5 Sheets-Sheet 5

GEORGE VINCENT PALMER,
HARLEY E. PRITCHETT,
INVENTORS.

BY

ATTORNEY.

2,900,061

AMBULATORY TYPEWRITER

George Vincent Palmer and Harley E. Pritchett, Los Angeles, Calif.

Application February 12, 1957, Serial No. 639,827
13 Claims. (Cl. 197—2)

This invention relates to a lightweight, entirely portable, self-propelling, ambulatory typewriter adapted to type directly onto a surface on which it is supported and to move upon such surface in an intermittent manner, so as to suitably space letters or figures which are being printed or typed upon the supporting surface. The invention also relates to means whereby the ambulatory typewriter may progress upon the supporting surface in a smooth, controllable manner, thereby maintaining a predetermined straight line of travel without damage to the supporting surface. Another aspect of the invention contemplates the provision of motor means and valve controlling means particularly adapted for use in devices of the character hereinabove stated, although such motor and valve control means may be employed in other combinations and relationships.

Architects, structural engineers, builders, designers, contractors, and other professional people have occasion to prepare plans, diagrams and the like upon which descriptive matter, specifications, instructions, and the like have heretofore been laboriously lettered by hand. Many of the plans and drawings (whether on paper, tracing cloth, or tracing linen) are very large and are incapable of being placed into a typewriter of the usual or customary type employing a cylindrical platen. Moreover, in many instances it is necessary that the legends being applied be at an angle to the normal framing of the drawing or plan. It is also impractical to repeatedly remove large sheets of drawings from a drafting table and reposition them thereon at a subsequent time. Hand lettering is not only time-consuming and expensive but unfortunately, in many instances, is not legible.

In accordance with the present invention an ambulatory typewriter is provided which is extremely light, can be accurately positioned upon any portion of a large drawing while such drawing is still mounted upon the drawing board or table and the desired material typed directly upon such drawing. Means are provided whereby the entire device may be oriented with respect to any desired angle and the motive power or traction permits the typing to be carried out accurately and easily even though underlying thicknesses of drawings differ widely. In other words, variation in smoothness of the supporting surface does not impair the accuracy or ease of operation of the machine.

The present invention also contemplates the provision of a driving motor and a traction means, the driving motor propelling the machine in a smooth manner without excessive vibration, jerkiness or jolting, which would normally impair the accuracy of the operator, causing undesired shifting of the typewriter upon the supporting surface and preventing the attainment of evenly spaced, properly aligned legends. The device of the present invention may be used as a self-contained unit containing its own driving means as well as a source of power, or it may be connected to a primary source of power such as compressed gas or electrical power by means of a flexible cable.

A primary object of the present invention, therefore, is to disclose and provide a lightweight, portable, self-propelled, ambulatory typewriter adapted to type directly upon the surface upon which it has been placed and is supported.

Another object is to disclose and provide novel traction means and traction-actuating means, whereby the ambulatory typewriter may be caused to move along a linear path upon a supporting surface consisting of tracing cloth or paper without damaging such surface.

Another object is to disclose and provide novel driving motors and driving controls, whereby intermittent movement may be imparted to a device such as an ambulatory typewriter without the generation of undesired vibration, jolting or jarring.

Again, an object of the invention is to provide selectively operable means capable of disengaging the traction means from the supporting surface and, alternatively, supporting the typewriter upon the supporting surface upon universal means, whereby the position of the typewriter may be easily and rapidly changed upon such surface.

Moreover, an object of the invention is to provide a construction wherein a traction unit and other portions of the ambulatory typewriter are in the form of subassemblies, whereby manufacture and subsequent repair is facilitated.

These and various other objects, advantages, adaptations and modifications of the invention will become apparent to those skilled in the art from the following description and appended drawings, in which.

Figure 5:
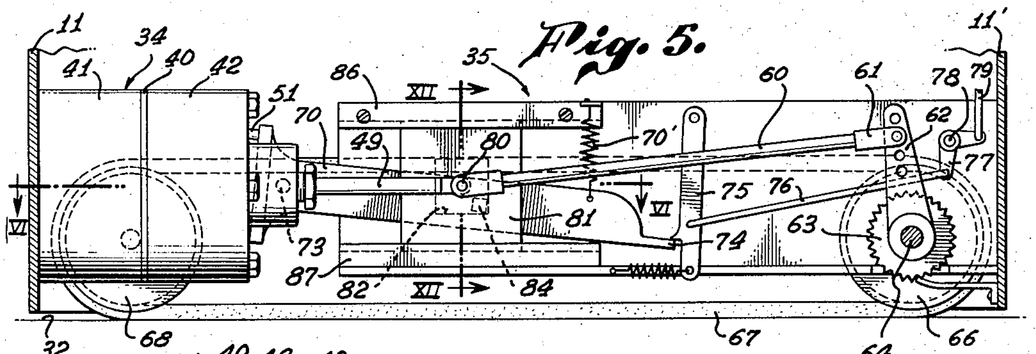
Fig. 5 is a vertical section, taken generally along the plane V—V in Fig. 4, illustrating in a more detailed but diagrammatic manner the driving motor, drive control and traction-actuating means.
Figure 6:
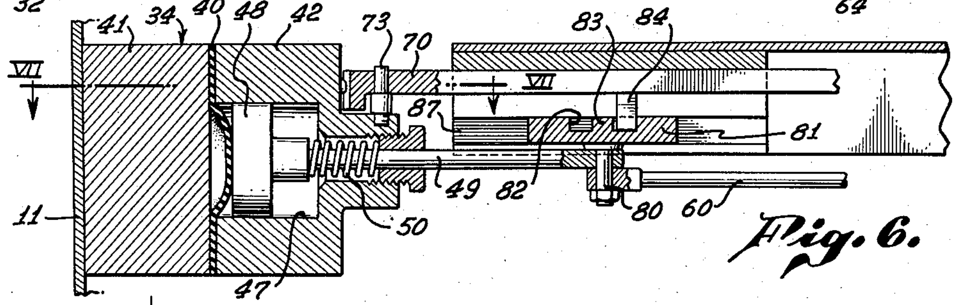
Fig. 6 is an enlarged horizontal section taken along plane VI—VI in Fig. 5.
Figure 7:
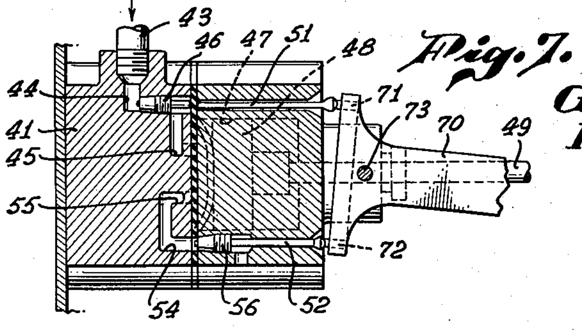
Fig. 7 is a vertical section taken along plane VII—VII in Fig. 6.

Fig. 8 to Fig. 11 inclusive illustrate various positions of the elements shown in Figs. 5 and 6, at different stages in a cycle of operations.

Figure 12:
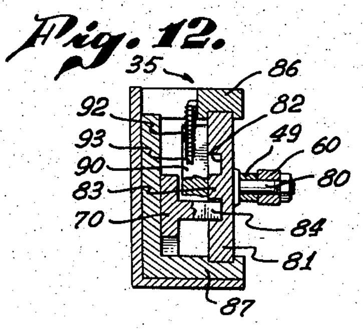

Fig. 12 is a vertical section taken along plane XII—XII in Fig. 5.

Figure 13:
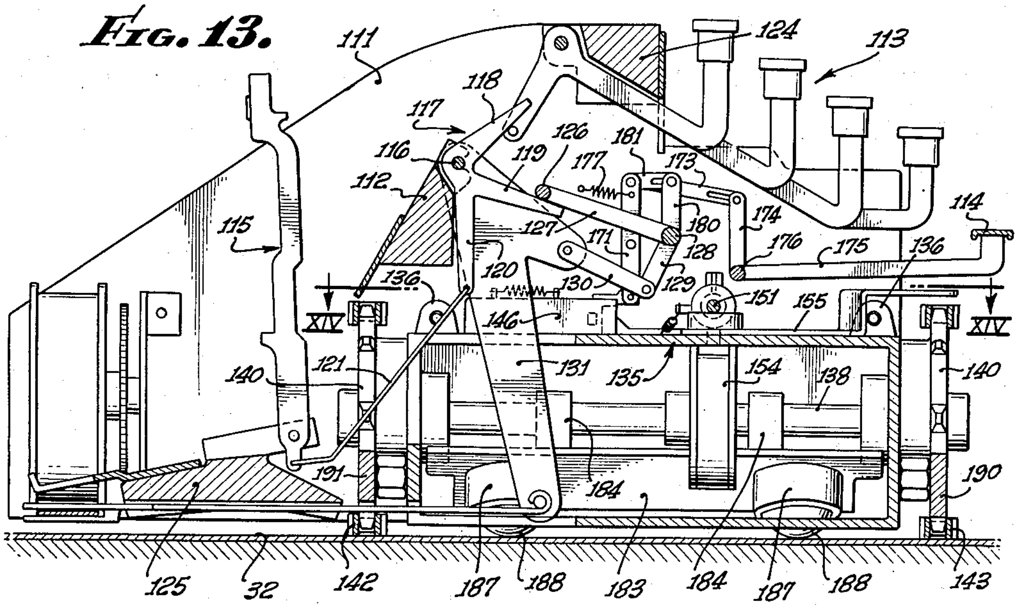

Fig. 13 is a transverse section through a simplified and modified form of device.

Figure 14:
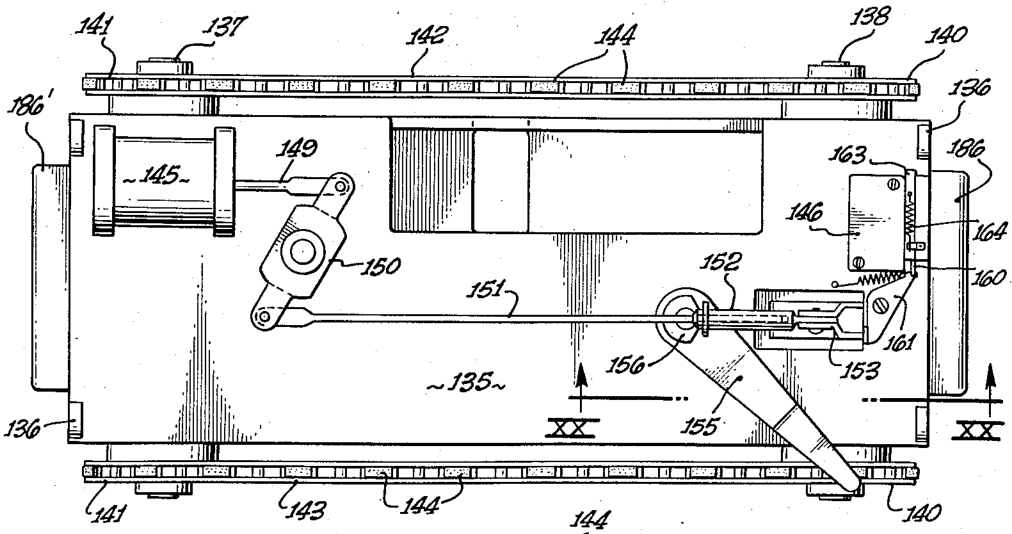

Fig. 14 is a plan view of the traction assembly and substantially equivalent to a plane taken along XIV—XIV in Fig. 13.

Figure 15:
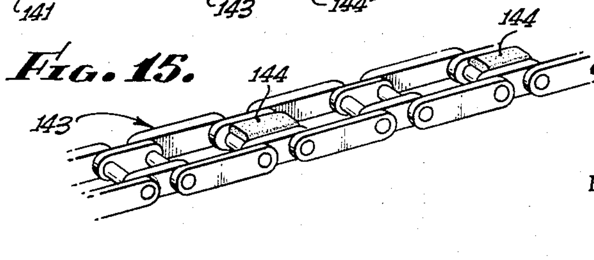

Fig. 15 is a perspective view of a portion of a belt.

Figures 16, 17, 18, 19, 20, 21:
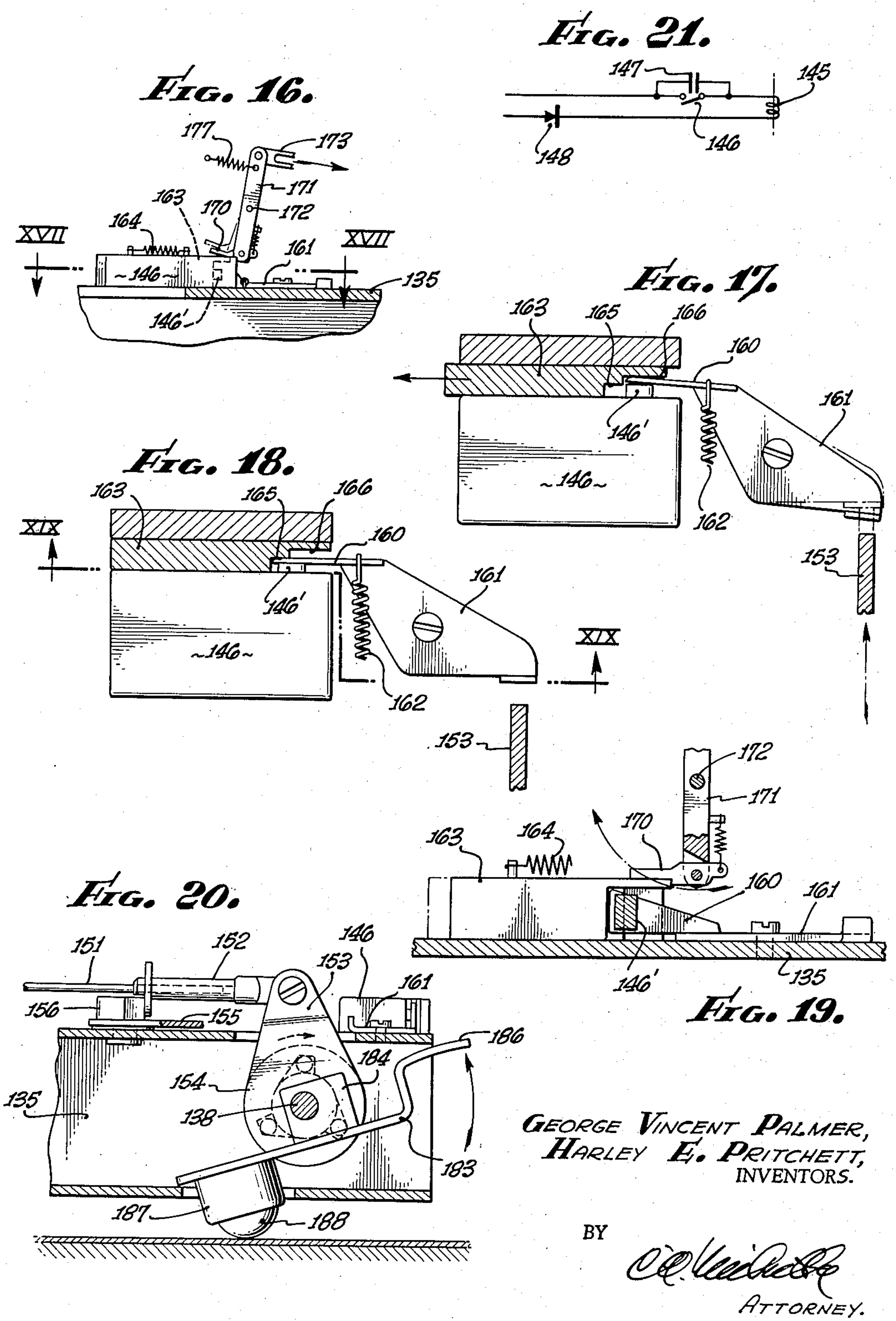

Fig. 16 is a side elevation of the actuating mechanism used in Fig. 13.

Figs. 17 and 18 are plan views of the actuating mechanism in two positions, the view being along plane XVII—XVII in Fig. 16.

Fig. 19 is an enlarged vertical section taken along the plane XIX—XIX in Fig. 18.

Fig. 20 is a vertical section taken approximately along plane XX—XX in Fig. 14.

Fig. 21 is a wiring diagram.

The ambulatory typewriter of the present invention may employ usual standard elements and means wherever possible and since the arrangement of the keyboard, key levers and buttons, typebar segment assembly, type bar, links, sublevers and type is well known, as are the various means for feeding a ribbon, vibrating the same, throwing the ribbon so that type strikes a desired portion of the ribbon, etc., these well-known and substantially standard constructions, linkages and means will not be described in detail, since such details can be found in many prior patents, among them being No. 1,251,361.

It may be noted, however, that in the form of ambulatory typewriter described hereinafter an anvil bar is not used in the typebar segment assembly, since it has been found desirable to permit the type to hit more freely than is the case in normal typewriters employing a smooth, cylindrical platen. By eliminating the anvil bar, irregularities in the supporting surface upon which the typewriter is progressing and writing do not impair the operation of the machine and permit clearcut impressions of type to be formed, even though portions of such surface may have three or four underlying thicknesses of drawings, whereas other portions have but one thickness.

Figure 4:
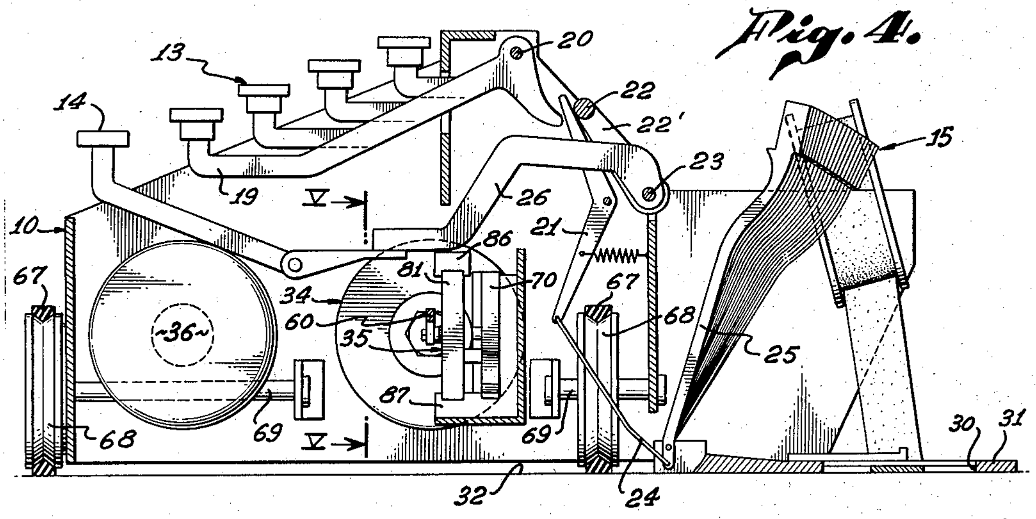
Fig. 4 is a vertical section, partly diagrammatic, illustrating certain essential elements of the typewriter.

Generally stated, the ambulatory typewriter of the present invention is of the down-strike design, wherein type bars strike downward to a common printing center and employs a frame 10 which may be provided with end frame members 11 and 11', a keyboard 13 including a space bar 14, a typebar segment assembly generally indicated at 15, and a suitable linkage for operating individual type bars by the depression of appropriate key levers. The linkage employed is of any desired type, and those skilled in this art may readily adapt existing parts for use in an ambulatory typewriter of this invention. As shown in Fig. 4, the assembly linkage there indicated, as an example, may include a key lever 19 pivoted at 20, sub-lever 21, universal rod 22 (connected to a shaft 23 which is operably connected to the ribbon-throw mechanism), link 24, and type bar 25. Universal rod 22 extends the entire width of the machine and is connected by arm 22' to the shaft 23, so that depression of any key will move the rod and impart partial rotation to shaft 23. The shaft may also be provided with an arm 26 capable of being actuated whenever the space bar 14 is depressed. It will be noted that in this arrangement, the typebars are so arranged as to strike downwardly through a typing aperture 30 formed in a substantially horizontal, transparent plate 31 which is suitably supported by the frame of the machine slightly above supporting surface 32, plate 31 being preferably scribed with parallel lines spaced a suitable distance apart so as to permit alignment of the typewriter with a line drawn on the supporting surface 32 or with a previously typed legend. The lines scribed on the plate are preferably parallel to the normal line of travel of the typewriter, but the plate may also carry additional lines at specified angles of say, 20°, 30° and 45° so as to permit legends to be applied at a predetermined angle to the line appearing on the drawing.

The ambulatory typewriter illustrated carries a driving motor indicated at 34, a drive control mechanism 35, and its own source of power in the form of a bottle 36 of compressed gas, such as carbon dioxide, air or nitrogen. A suitable pressure reducing valve 37 is employed between the bottle of compressed gas 36 and the motor 34. Means are preferably provided whereby the seal on the bottle is automatically pierced whenever a new bottle is installed in the machine.

Figure 9:
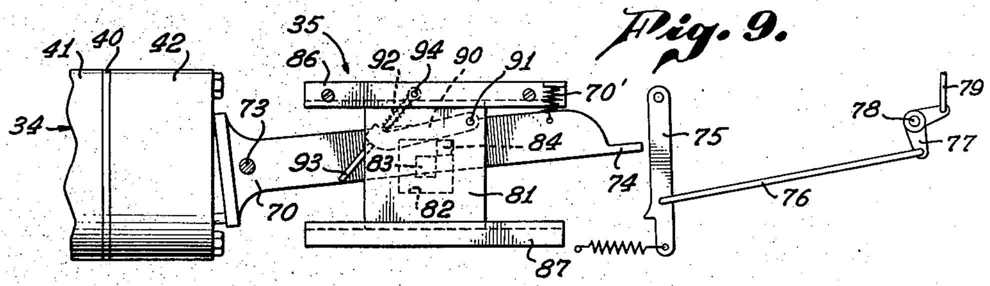
Figure 10:
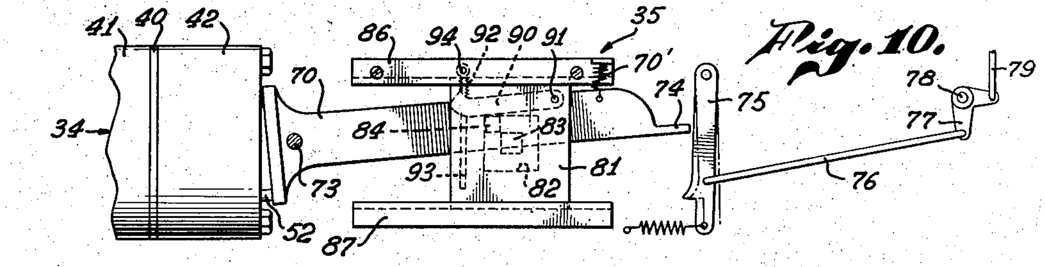
Figure 11:
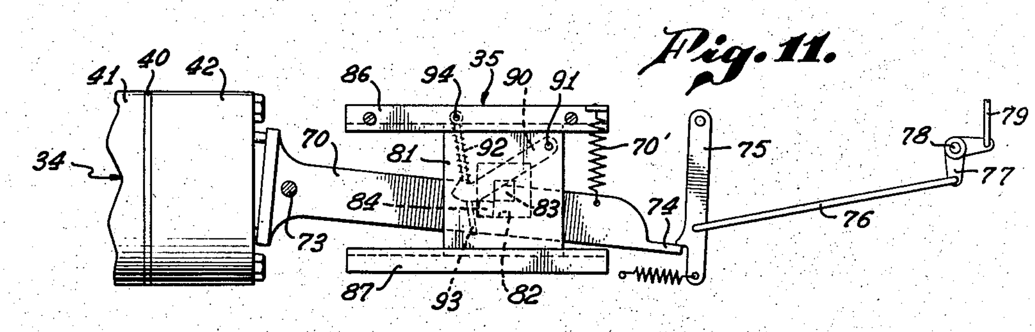

Although any kind of pressure fluid motor can be used, such as an oscillating vane type, one form of motor which has been employed very satisfactorily is illustrated in Figs. 5, 6 and 9, and comprises a flexible resilient diaphragm 40 between a rear body portion 41 and a front body portion 42. The rear body portion 41 is provided with a pressure gas inlet 43 in communication with the low-pressure side of the pressure reducing valve 37, this inlet being connected as by conduit 44 with air supply port 45. A valve 46 is located in the conduit 44, this valve being actuated by a valve pin 51 extending through the front body portion and being adapted to be moved sufficiently to open the intake valve 46 whenever a power stroke is desired and admit fluid under a desired pressure (but lower than in reservoir 36) to act upon the rear side of diaphragm 40. Fig. 6 shows diaphragm 40 partly distorted and extended under pressure of admitted fluid.

The front body portion 42 is provided with a cylinder 47 containing a piston 48 attached to the end of piston rod 49. Spring means 50 normally bias the piston against the diaphragm 40 and the end of the cylinder formed by the rear body portion 41. Air supply port 45 is adapted to supply air against the rear face of the diaphragm 40, thereby stretching such diaphragm and forcing the piston 48 and diaphragm 40 outwardly during a power stroke. After the supply valve 46 has been closed, discharge valve 56 is opened, this valve being located in conduit 54 leading to exhaust port 55; exhaust port is also in communication with rear face of diaphragm 40. Both of the valves 46 and 56 may be of the spring-biased, tire valve type, readily threaded into conduits 44 and 54 respectively, and operable by light push rods or pins 51 and 52 extending through suitable bores formed in body portion 42.

It is important to note that the power stroke of the piston is attained by admitting compressed gas into the power cylinder. The piston drives the traction-actuating means 35 and the use of a compressible gas results in a smoothly operating drive which does not transmit sharp jolts or jars to the device.

The end of piston rod 49 is connected to a connecting rod 60, the other end of such connecting rod being adjustably connected as at 61 to a desired point along the length of a ratchet or one-way clutch lever 62 connected to a one-way clutch or ratchet drive 63 carried by drive shaft 64. The drive shaft 64 is mounted in suitable bearings carried by the frame and has drive wheels 66 mounted thereon, these drive wheels being grooved to receive endless V-shaped belts 67, each belt passing over an idler pulley or wheel 68 mounted on a shaft 69 journalled in the opposite end of the frame. The lower lay of these V belts extends slightly below the bottom plane of the frame and constitutes the traction means upon which the entire device rests, the V belts being in direct contact with the supporting surface 32 of the drawing upon which typing is to be done. In actual practice, it is desirable to have the two V belts parallel and equally spaced on opposite sides of a vertical line passing through the center of gravity of the entire ambulatory typewriter, this insuring balance and facilitating the travel of the device along a straight path.

It may be noted that by adjusting the point of connection between the connecting rod 60 and lever 62, the travel of the typewriter at each stroke of a key can be varied. Any desired means can be used for adjusting the connection between 60 and 62 to vary the stroke. The typewriter of the present invention does not employ the usual escapement wheel and the means hereinabove described permit a great variation in the spacing between the individual letters of symbols being typed.

The drive control and valving arrangement used may assume a great many forms. That illustrated in Figs. 5 to 8 comprises a valve rocker arm 70 pivoted at 73 and provided with a head having adjustable valve-actuating studs 71 and 72 adapted to move valve stems 51 and 52 in alternate succession. The free end of the valve rocker arm 70 is provided with an offset lip 74 adapted to cooperate with a pivotally mounted detent arm 75, spring biased so as to normally hold the valve rocker arm 70 in the position indicated in Figs. 5 to 8 in which position the outlet valve 56 is open and the piston 48 is in its normal, at-rest position under the influence of spring 50. Detent arm 75 is connected by a link 76 to bell crank lever 77 pivoted at 78 near one end frame and such bell crank lever 77 is connected by means of link 79 to lever arm 26 (see Fig. 4) carried by the shaft 23. When, therefore, the spacing bar 14 or any key of the keyboard is depressed, bell crank lever 77 is partly rotated on its pivot and detent arm 75 moved to unlatch the free end and lip 74 of the valve rocker arm 70. This free end is normally biased upwardly as by spring 70′ and will rock upon pivot 73 to close the outlet valve 56 and immediately open the air inlet valve 46 and supply pressure fluid to driving motor 34.

By referring to Figs. 6 and 8 to 12, a valve control mechanism will be described which prevents the rocker arm 70 from assuming a dead-center position and rendering the device inoperative. As there shown, the end of the piston rod 49 is connected to a stud 80 extending from a slide member 81 mounted for sliding motion along a path parallel to the path of the piston rod in upper and lower guide rails 86 and 87. The inner face of this slide member is provided with a cam groove 82 of any desired shape, preferably in the form of a square or parallelogram provided with the central island 83. The valve rocker arm 70 is provided with a dog 84 extending into and movable within the cam groove 82.

Figure 8:
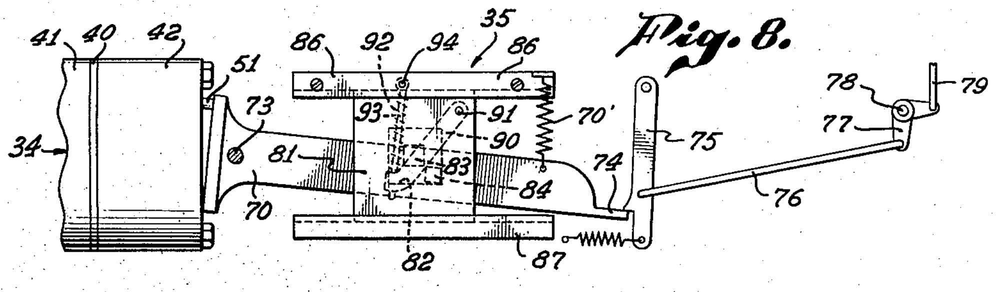

The normal, at-rest position of the dog is indicated in Fig. 8, the piston rod and connecting rod being eliminated from this and the subsequent three figures for purposes of clarity. As soon as the detent 75 unlatches valve rocker arm 70, it rocks into its uppermost position (Fig. 9) under the influence of biasing spring 70′. This opens air supply valve 46 and slide member 81 then initiates its movement on the power stroke; it will be noted that the dog 84 rides along the upper portion of the cam groove 82, being prevented from moving downwardly by the central island 83 formed in the slide member. At the end of this power stroke the dog assumes a position indicated in Fig. 10. Downward movement of the dog 84 in the cam groove 82 may be facilitated by suitable inclination of the walls of the cam groove 82 and can be expedited so as to positively move the dog 84 and its valve rocker arm 70 past dead-center position by means of a presser cam 90 pivotally connected to the slide member at 91 and urged downwardly by means of a spring 92 carried by a pin 93 pivoted at 94 to the upper guide rail 86, the spring 92 bearing down against the foot of the presser cam 90. It will be noted that this spring 92 has been compressed during the power stroke and at the end of such power stroke forces the dog 84 downwardly into the position indicated in Fig. 11, thereby preventing the dog (and valve rocker arm 70) from assuming a dead-center position. Pivoted pin 93 slidably extends through the foot of the presser cam.

It may be noted that by suitably proportioning the parts, the detent 75 does not unlatch the valve rocker arm 70 until the type face is in close proximity to the typing aperture, so that the actual typing or imprinting operation takes place during the upward movement of the dog 84 within the cam groove 82 after the release of the detent 75 and a power stroke is thus initiated immediately after the imprint has been made. The typewriter is stationary during printing. During the power stroke and movement of the slide member 81 from the position indicated in Fig. 9 to Fig. 10, power is applied to the traction-actuating means 35 and V-belt traction means. By the use of suitable rubber or rubber-like compositions in the V-belt drives, good, non-smearing but gripping action is exerted upon the supporting surface 32 whether it be made of paper, tracing linen or other material, and the entire typewriter positively and smoothly advances a predetermined distance (determined by 60, 61, 63) into position for a second imprinting operation. It is to be further understood that upon each imprinting operation, the ribbon is suitably advanced by means well known in the art. The return stroke of the slide member 81 is under the influence of spring 50 as heretofore stated and the slide member 81 moves from the position indicated in Fig. 11 to the initial or starting position of Fig. 8.

The ambulatory typewriter of the present invention need not employ or carry its own supply of compressed gas, nor is the invention limited to the specific type of motor herein shown. The motor, of whatever type employed, may be supplied with compressed gas by means of a flexible tube or hose leading to a large supply tank provided with the usual pressure-reducing valve. The motor need not be of the piston type but instead, may be of the vane type of the character used in actuating windshield wipers. Very small, fractional horsepower electric motors may also be employed and a driving connection selectively and controllably made between the motor and the traction-actuating means through a suitable clutch mechanism which is placed in engagement whenever the space bar of a key is depressed. However, as previously indicated, pressure fluid means are preferred because of the compressible character of the gas and resulting freedom from jolting.

One of the characteristics of the device described hereinbefore is that in the event the space bar is depressed and held in a depressed position, the motor 34 continues to operate and the typewriter continues to move on the supporting surface as long as the bar is depressed. This is due to the fact that the valve rocker arm is upwardly biased and immediately initiates a new stroke upon the completion of the preceding stroke.

In the modified form of device described subsequently, the typewriter will not continue to move when the space bar or key is struck and kept down, the travel of the machine being limited to but one space, thereby precluding skip spaces.

Figure 3:
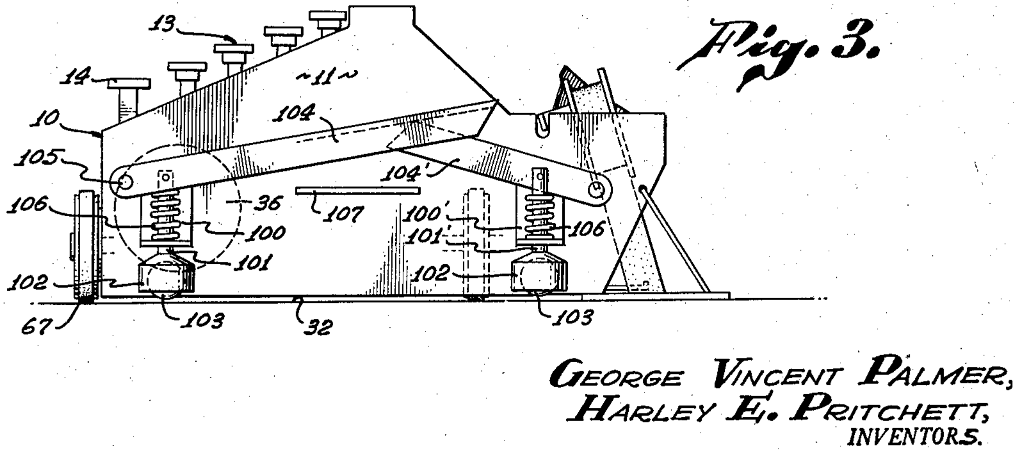

Additional means are provided for disengaging the traction means from the supporting surface and substituting universal means which permit the ambulatory typewriter to be rapidly moved in any direction without rubbing the traction means against the drawing. Such means may be carried by end frame members 11 and 11′. Fig. 3 illustrates one form of such means wherein frame member 11′ is provided with a pair of brackets 100 and 100′, each bracket being ported to slidably receive a vertical stem 101, the lower end of such stem, below the bracket, being provided with a housing 102 rotatably retaining a ball 103 having a downwardly directed exposed portion. A lever 104, pivoted to the frame at 105 rests upon top of stem 101, which is upwardly biased by spring 106. A similar lever 104′ is similarly pivoted and cooperates with stem 101′, the free ends of the levers overlapping in a nested relation (being of channel or angle iron section and one being wider than the other) above a lip 107 extending from the frame. By grasping lip 107 with the fingers and the lever 104 with the thumb so as to move the levers toward lip 107, the stems 101 and 101′ are moved down to cause universally rotatable balls 103 to contact the supporting surface 32, raise the typewriter sufficiently to disengage belts 67 from such supporting surface and permit the typewriter to be rolled on the supporting surface in any direction.

Figure 1:
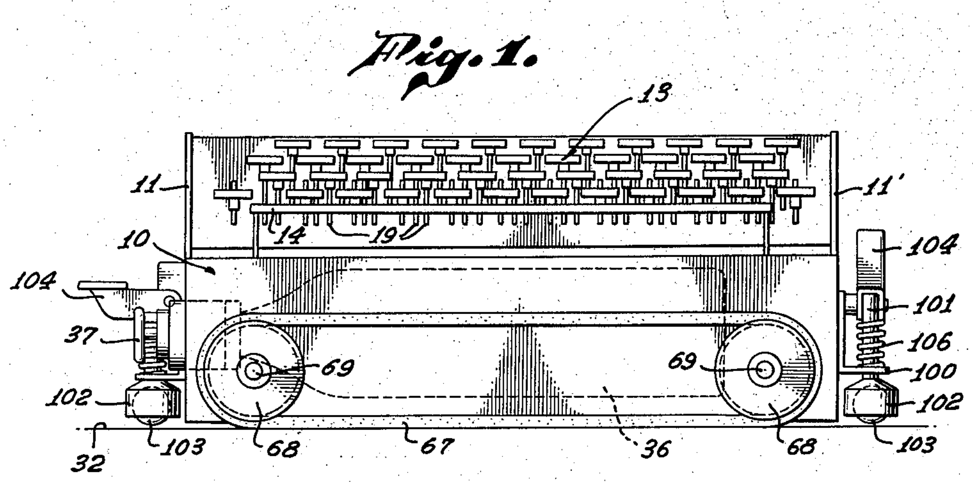
Fig. 1 is a front view of one form of ambulatory typewriter embraced by this invention.
Figure 2:
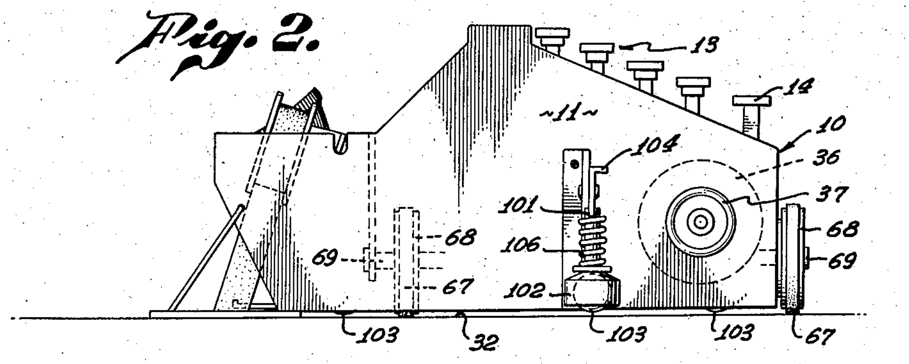
Figs. 2 and 3 are end views of the typewriter illustrated in Fig. 1.

Fig. 2 illustrates a single universal ball, selectively operable support of the same type. It has been found that a three-point support gives greater mobility and is adequate. The belt type traction means differs from the selectively operable ball means in that the belts (which may be of any desired width) insure rectilinear travel, distribute the weight of the machine over a large area, and do not wrinkle or stretch the paper or other supporting surface.

It may also be noted that the pressure-reducing valve controls the speed at which the traction means operates in performing one cycle. This is important because when the operator is typing a few figures only in a restricted space (as when a dimension is being indicated on a drawing) it is desirable to have the machine move deliberately and slowly; when a long specification or description is being typed, it is desirable to have the machine travel more rapidly.

As previously stated, the present invention is not limited to any specific type of keybar-actuating mechanism, but relates to any down-strike type of movement arranged to permit the type bars to strike downward to a common printing center lying in a plane virtually coplanar with the bottom or base of the machine. The ambulatory typewriter of this invention is a completely portable, mobile unit which does not use guide rails, is not geared to guide rails, is not limited in its movement by any extraneous piece of mechanism, and which will type and move upon any reasonably flat or smooth supporting surface or plane, whether such plane be horizontal or inclined. It does not employ a platen or movable carriage, paper bail, paper fingers, tabulating mechanism, or normal escapement and line space devices, and can be manufactured very inexpensively. The belt type traction means, gas reservoir, valve and means connecting the motor to the belt-type traction means may be carried by a sub-frame which is detachably connected to the frame of the typewriter, for ease of installation or removal for repair, the mechanism of such sub-frame assembly being connectable to bell crank lever 77 or equivalent portion of the typewriter so as to be responsive to every movement of the space bar or type key. The compressible and expandable nature of gas in the motor means imparts a smooth, dampened movement or action to the machine, which action cannot be attained by the use of spring motors.

The simplified form of ambulatory typewriter illustrated in Figs. 13 to 20 has a number of advantageous features which facilitate manufacture, assembly and repair. The end frames such as 111 are rigidly connected by member 112 including rod 116 on which a down-strike actuating assembly, including the bell crank levers 117 (having arms 118, 119 and 120) are pivotally mounted. Element 125 carrying type bar segment assembly 115 also connects the end frames. The down strike actuating assembly interconnects the type bar segment assembly 115 with the keyboard 113, all of the keys of said keyboard being pivotally connected to a transverse element 124 removably connected to and joining the end frames. Elements or members 112, 124 and 125 hold the end frames in spaced relation; each of these members and the keys and levers carried by them constitute a separate sub-assembly. The entire keyboard 113, for example, can be removed by removing member 124. Inner ends of the key levers carry pins which bear against arms 118; arms 120 are connected by links 121 to type bars of the segment assembly.

Arms 119 bear against a universal rod 126 extending between and connected to lever arms 127 mounted upon shaft 128 journalled in the end frames. Shaft 128 also carries lever 129, and partial rotation of shaft 128 moves arm 129, which by linkage 130 actuates bell crank 131 and the ribbon throw sub-assembly.

A tractor assembly is provided, which is removable as a unit from the typewriter. The illustrated tractor assembly comprises a box-like housing 135 provided with ears 136 into which suitable screws extend from the end frames and removably connect the tractor assembly to the typewriter. Two shafts 137 and 138 are journalled in housing 135 and extend therefrom. Both shafts are provided with sprockets such as 140 and 141 to receive and simultaneously drive traction belts 142 and 143. One of the shafts, such as 137, may be mounted in a bearing which is spring biased away from the other shaft, whereby the belts are maintained taut at all times.

The two traction belts are parallel and their lower lays are parallel to bases of type when in imprinting position and in a common plane. Each of the belts may be of link chain construction as shown in Fig. 15 and be substantially nonstretchable, but in order to have good traction on the supporting surface 32 the belts preferably carry a plurality of resilient feet or pads as 144.

The motor means of the simplified form comprise a solenoid of the plunger type 145 which is supplied with electrical energy under the control of a microswitch 146 as illustrated in Fig. 21. The switch may have a capacity shunt 147 and any suitable type of rectifier 148 may be used for the purpose of converting normal alternating current into direct current supplied to the device.

By referring to Fig. 14, it will be observed that the solenoid 145, as well as the microswitch 146, are carried by the tractor assembly 135. When the solenoid is energized, the motion of the movable core is transmitted by link 149 to a pivoted lever 150, the opposite end of such lever being connected to a push rod 151 which is telescopically received in element 152 connected to the upper end of an arm 153 extending from a one-way clutch 154 carried by the shaft 138 so that each reciprocation of the push rod 151 produces a predetermined travel of the traction belts and of the typewriter supported thereby. Ordinarily, the end of the push rod 151 bears against the bottom of the socket in element 152; in order to vary the travel of the typewriter upon the supporting surface the effective length of the stroke of push rod 151 and arm 153 may be controlled by adjustment lever 155 provided with a cam 156. Movement of the arm 155 will move member 152 (and arm 153) so that when the solenoid is subsequently energized only a portion of the travel of push rod 151 will be effective in moving member 152, arm 153 and the one-way clutch 154.

Means have been provided to insure but a single actuation of the traction belts and but a single energization of the solenoid when a key or space bar 114 is depressed. In other words, even though the space bar is held down the typewriter will only move once. Means for accomplishing this highly desirable result are best seen in Figs. 16 to 20. Fig. 18 illustrates the microswitch 146 with its button 146' in depressed open circuit position, and it will be seen that the button is maintained in this position by means of an arm 160 carried by a bell crank lever 161 which is normally biased as by spring 162 into a position where such arm 160 bears against button 146'. Adjacent the microswitch 146 is a spring biased retainer 163, normally urged as by spring 164 into the position illustrated in Fig. 18, such retainer having two steps cut therein as at 165 and 166. When the arm 160 rests against step 165 the button of the microswitch is in disconnected position; when the button 146' is normally urged outwardly and the arm 160 is against step 166 of retainer 163 (as in Fig. 17) the switch 146 is in closed circuit position.

The retainer 163 is moved in the direction of the arrow in Fig. 17 and against its biasing spring 164 by means of a latch element 170 carried by lever arm 171 pivoted at 172 (see Figs. 13, 16 and 19). Latch 170 is normally spring biased downwardly but cannot swing outwardly from the position indicated in Fig. 19. It will be noted that the latch is provided with a shoulder adapted to engage a lip formed in the upper edge of the retainer 163.

The upper end of lever arm 171 is connected by means of link 173 to a lever arm 174 rigid with the space bar arm 175, this assembly being pivoted to the frame at 176. When the space bar 114 is depressed the lever arm 171 will move in the direction of the arrow as indicated in Fig. 16 and the latch 170 will rapidly move retainer 163 in the direction of the arrow indicated in Fig. 17, permitting button 146' to move arm 160 against step 166 as shown in Fig. 17 since spring 162 is relatively weak. This will close the circuit, energize the solenoid and actuate the traction mechanism moving arm 153 of the one-way clutch in the direction of the arrow indicated in Fig. 17 causing such arm to strike bell crank 161 and return arm 160 to its original position (Fig. 18) depressing button 146' and permitting biasing spring 164 to return the retainer 163 into the position shown in Fig. 18 thereby breaking the circuit even though the space bar 114 is still depressed. As soon as the pressure on the space bar 114 is removed suitable biasing spring 177 returns lever arm 171 and latch 170 to its original position (Fig. 19).

When a key of the keyboard 113 is depressed, its inner end moves arm 118 causing arm 119 to move universal rod 126; this causes partial rotation of shaft 128 and of arm 180. Arm 180 is provided with a pin extending into a slot formed in link 181 connected to the upper end of lever arm 171 again causing a rocking motion of such arm to cause the latch 170 to again move retainer 163 into the position shown in Fig. 17 to open the circuit. By this time one of the type bars has imprinted upon the supporting surface, and when the circuit is closed the typewriter moves by virtue of its traction belts and immediately stops even though the key remains depressed.

The slot in link 181 permits the space bar 114 to be depressed and the switch closing means to be actuated without causing any movement of the universal rod 126.

The device herein illustrated is also provided with means for raising the entire typewriter above the supporting surface so as to disengage traction belts 142 and 143 from supporting engagement with said surface. In the illustrative embodiment, each of the shafts 137 and 138 is provided with a sub-frame such as the sub-frame 183 illustrated in Fig. 20. This sub-frame may include a pair of upstanding lugs 184 provided with aligned ports through which the shaft 138 may pass, the entire sub-frame being thus pivotally mounted upon the shaft. The outer end of sub-frame 183 may be provided with an outstanding lip 186, whereas the inner end may be provided with a suitable socket 187 rotatably retaining a ball or balls 188, capable of extending downwardly through a suitable aperture in the box-like traction housing 135. The lips 186 and 186' extend outwardly beyond the side frames of the typewriter and when these are grasped and lifted the universally rotatable balls 188 bear against the supporting surface and raise the entire typewriter sufficiently to cause disengagement of the belts from such supporting surface. In this position the entire typewriter may be readily moved in any desired direction upon the supporting surface without causing any smudging by frictional contact of the belts with said supporting surface. The typewriter can, therefore, be accurately positioned as previously described, and when the lifting force on the lips 186 is removed the entire typewriter is again supported by its belts and is in desired position to type upon the supporting surface.

It may be noted that in order to insure that the typewriter moves along a rectilinear path, each lower lay of the belts 142 and 143 may slidably engage a fixed guide bar carried by the tractor assembly, each guide bar depressing its associated lower lay and insuring that such lay assumes a straight line with all portions of such lay in contact with the supporting surface. Such guide bars are illustrated in Fig. 13 at 190 and 191.

This application is a continuation-in-part of copending application Serial No. 384,444, filed October 6, 1953 and now abandoned. All changes, modifications, adaptations and uses coming within the scope of the appended claims are embraced thereby.

We claim:

1. An ambulatory, self-propelling, portable typewriter comprising: a frame, keyboard and type bars associated therewith, belt-type, elongated traction means carried by the frame and arranged to support the frame upon any virtually plane supporting surface, a printing center lying in a plane virtually co-planar with such supporting surface, a down-strike actuating mechanism connecting the keyboard with the type bars, said belt-type traction means being in alignment with bases of type in imprinting position; a pressure-fluid-operated motor means and a reservoir of pressure fluid carried by the frame, said reservoir being connected to the motor means; an operable connection between the motor means and traction means; and means for energizing the motor means when the down-strike actuating mechanism is actuated.

2. An ambulatory typewriter of the character stated in claim 1, wherein the traction means include a pair of spaced, parallel, resilient belts adapted to support and propel the typewriter upon a supporting surface.

3. An ambulatory typewriter as stated in claim 1, wherein the connection between the motor means and traction means is adjustable to vary the travel of the typewriter.

4. An ambulatory typewriter as stated in claim 1, including manually and selectively operable universally rotatable means carried by the frame and adapted to be lowered into contact with a supporting surface to thereby raise the typewriter and disengage the traction means from supporting engagement with the supporting surface.

5. An ambulatory typewriter of the character stated in claim 1 wherein the traction means are actuated after an imprint has been made by a type bar.

6. An ambulatory, self-propelling, portable typewriter comprising: a frame; a down-strike type bar segment assembly carried by the frame; a keyboard assembly comprising a plurality of key levers pivotally connected to and carried by a single element connected to the frame; a down-strike actuating mechanism interconnecting the keyboard assembly and type bar segment assembly; a tractor assembly including a pair of parallel continuous belts, the lower lays of said belts lying in a common plane and adapted to support the typewriter upon a supporting surface for movement in a direction parallel to the bases of type in imprinting position; means for intermittently driving the belts a predetermined distance including a motor; means for energizing the motor when the down-strike actuating mechanism is actuated; and manually and selectively operable universally rotatable means carried by the typewriter and adapted to be lowered into contact with a supporting surface to thereby raise the typewriter and disengage the belts from supporting engagement with such surface.

7. An ambulatory typewriter as stated in claim 6, wherein the tractor assembly includes a pair of shafts, each provided with sprockets, for driving said belts, the universally rotatable means are carried by sub-frames pivotally mounted on the tractor assembly, and said tractor assembly is mounted in said typewriter for removal as a unit.

8. An ambulatory, self-propelling, portable typewriter comprising: a frame; a down-strike type bar segment assembly carried by the frame; a keyboard assembly comprising a plurality of key levers pivotally connected to and carried by a single element removably connected to the frame; a down-strike actuating mechanism interconnecting the keyboard assembly and type bar segment assembly; a tractor assembly removably connected to said frame, said tractor assembly including a pair of continuous traction belts with their lower lays parallel to bases of type in imprinting position in a common supporting plane; a motor means and an operative driving connection between said motor means and traction belts; and means for energizing the motor means when the down-strike actuating mechanism is actuated.

9. An ambulatory typewriter as stated in claim 8, including manually and selectively operable traction release means carried by the typewriter, said traction release means including universally rotatable elements adapted to be lowered into contact with a supporting surface to thereby raise the typewriter and disengage the traction belts from supporting engagement with the supporting surface.

10. In an ambulatory, self-propelling, portable typewriter provided with a down-strike type bar assembly and a keyboard operably associated therewith, the provision of: a tractor assembly including a pair of parallel continuous belts, each of said belts being substantially non-stretchable and being provided with a plurality of resilient feet, the lower lays of said belts lying in a common plane and adapted to support the typewriter upon a supporting surface for movement in a direction parallel to the bases of type in imprinting position; means for intermittently driving the belts a predetermined distance including a motor; means for energizing the motor when a type bar is operated by the keyboard; and manually and selectively operable, universally rotatable means carried by the typewriter and adapted to be lowered into contact with a supporting surface to thereby raise the typewriter and disengage the belts from supporting engagement with said surface.

11. In an ambulatory, self-propelling, portable typewriter provided with a down-strike type bar assembly and a keyboard operably associated therewith, the provision of: a tractor assembly mounted in the typewriter for removal as a unit, said tractor assembly including a pair of parallel continuous belts, the lower lays of said belts lying in a common plane and adapted to support the typewriter upon a supporting surface for movement in a direction parallel to the bases of type in imprinting position; means for intermittently driving the belts a predetermined distance including a plunger-type solenoid motor means, a one-way clutch, a reciprocal link and means for selectively varying the effective length of the link to vary the travel of the typewriter upon the supporting surface; means for energizing the motor means when a type bar is operated by the keyboard; and manually and selectively operable, universally rotatable means carried by the typewriter and adapted to be lowered into contact with a supporting surface to thereby raise the typewriter and disengage the belts from supporting engagement with said surface.

12. An ambulatory typewriter as stated in claim 6 including a pair of fixed guide means, each guide means cooperatively and slidably engaging one of said lower lays, to maintain said lays straight and parallel.

13. In an ambulatory, portable typewriter including a frame, a keyboard assembly and a down-strike type bar segment assembly operably associated therewith, the provision of: a tractor assembly removably connected to the frame, said tractor assembly including a pair of continuous traction belts, the lower lays of said belts lying in a common and constant plane with respect to the frame and adapted to support the typewriter upon a supporting surface for movement in a direction parallel to the bases of type in imprinting position; a fixed guide means slidably engaging each of said lower lays to maintain the latter in straight and parallel relation; means for driving said belts in unison in increments of predetermined distance; and manually and selectively operable, universally rotatable means carried by the typewriter and movable vertically with respect to said frame and adapted to be lowered into contact with a supporting surface to thereby raise the typewriter and disengage the belts from supporting engagement with such surface.

References Cited in the file of this patent

UNITED STATES PATENTS

| | | |
|---|---|---|
| 2,460,813 | Dohn | Feb. 8, 1949 |

FOREIGN PATENTS

| | | |
|---|---|---|
| 346,464 | Italy | Feb. 17, 1937 |
| 642,907 | Great Britain | Sept. 13, 1950 |